(12) United States Patent
Pyo

(10) Patent No.: US 8,835,045 B2
(45) Date of Patent: Sep. 16, 2014

(54) BATTERY PACK AND MANUFACTURING METHOD FOR THE SAME

(75) Inventor: Kyung Rae Pyo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 248 days.

(21) Appl. No.: 13/419,658

(22) Filed: Mar. 14, 2012

(65) Prior Publication Data

US 2013/0045397 A1    Feb. 21, 2013

(30) Foreign Application Priority Data

Aug. 16, 2011 (KR) .................. 10-2011-0081180

(51) Int. Cl.
| | | |
|---|---|---|
| *H01M 2/02* | (2006.01) | |
| *H01M 2/10* | (2006.01) | |
| *H01M 2/26* | (2006.01) | |
| *H01M 2/06* | (2006.01) | |
| *H01M 2/20* | (2006.01) | |
| H01M 10/6553 | (2014.01) | |
| H01M 10/24 | (2006.01) | |
| H01M 2/30 | (2006.01) | |
| H01M 10/34 | (2006.01) | |
| H01M 2/24 | (2006.01) | |
| H01M 10/0525 | (2010.01) | |

(52) U.S. Cl.
CPC ........ *H01M 2/1061* (2013.01); *H01M 10/5051* (2013.01); *H01M 2/021* (2013.01); *H01M 2/26* (2013.01); *H01M 2/06* (2013.01); *H01M 2/20* (2013.01); *H01M 2/1011* (2013.01); *H01M 2/0215* (2013.01); *H01M 2/204* (2013.01); H01M 10/24 (2013.01); H01M 2/307 (2013.01); H01M 10/345 (2013.01); Y02E 60/12 (2013.01); H01M 2/24 (2013.01); H01M 10/0525 (2013.01)
USPC ........... 429/170; 429/121; 429/122; 429/123; 429/138; 429/153; 429/161; 429/163; 429/169; 429/175; 429/176; 429/178

(58) Field of Classification Search
CPC .......... H01M 2/1061; H01M 10/0525; H01M 10/345; H01M 2/204; H01M 2/30; H01M 2/1011; H01M 2/20; H01M 2/202; H01M 2/24; H01M 2/26; H01M 10/5051; H01M 2/307; H01M 2/021; H01M 2/0212; H01M 2/027; Y02E 60/12
USPC ......... 429/121, 122, 123, 138, 153, 161, 163, 429/169, 170, 175, 176, 178
See application file for complete search history.

(56) References Cited

U.S. PATENT DOCUMENTS

| | | | |
|---|---|---|---|
| 2006/0057461 A1* | 3/2006 | Hamada et al. ................ | 429/181 |
| 2009/0155632 A1* | 6/2009 | Byun et al. ........................ | 429/7 |

(Continued)

FOREIGN PATENT DOCUMENTS

| | | |
|---|---|---|
| JP | 2001-266820 A | 9/2001 |
| KR | 1020060027249 A | 3/2006 |

(Continued)

OTHER PUBLICATIONS

Korean Notice of Allowance dated May 22, 2013 in corresponding Korean Patent Application No. 10-2011-0081180, and Request for Entry of the Accompanying Office Action attached herewith.

*Primary Examiner* — Patrick Ryan
*Assistant Examiner* — Ben Lewis
(74) *Attorney, Agent, or Firm* — Robert E. Bushnell, Esq.

(57) ABSTRACT

A battery pack having a case where connection tabs can be accurately positioned within the case and where welding holes in the case are formed to provide access to a welding rod and to allow heat to escape. Connection tabs are fixed into a lower case, batteries are arranged in the case, and then a welding process is performed to attach electrode tabs of the battery to the connection tabs so that the batteries can be connected together, to an external terminal and to a protection circuit module.

20 Claims, 5 Drawing Sheets

(56) References Cited

U.S. PATENT DOCUMENTS

| | | |
|---|---|---|
| 2010/0203363 A1* | 8/2010 | Kwak et al. .................. 429/7 |
| 2010/0316893 A1 | 12/2010 | Kim |
| 2011/0008667 A1 | 1/2011 | Kwag et al. |
| 2011/0039131 A1 | 2/2011 | Moon |
| 2011/0143187 A1 | 6/2011 | Han et al. |

FOREIGN PATENT DOCUMENTS

| | | |
|---|---|---|
| KR | 20080090773 A | 10/2008 |
| KR | 1020100134401 A | 12/2010 |
| KR | 20110005168 A | 1/2011 |
| KR | 20110017821 A | 2/2011 |
| KR | 20110066636 A | 6/2011 |

* cited by examiner

BATTERY PACK AND MANUFACTURING METHOD FOR THE SAME

CLAIM OF PRIORITY

This application makes reference to, incorporates the same herein, and claims all benefits accruing under 35 U.S.C. §119 from an application for BATTERY PACK AND MANUFACTURING METHOD FOR THE SAME earlier filed in the Korean Intellectual Property Office on 16 Aug. 2011 and there duly assigned Korean Patent Application No. 10-2011-0081180.

BACKGROUND OF THE INVENTION

1. Field of the Invention

Embodiments of the present invention relate to a battery pack and a manufacturing method for the same.

2. Description of the Related Art

A battery pack having a plurality of batteries electrically connected can be used as a power storage device that enables power stored in the batteries to be used whenever necessary.

The battery pack may include a temperature sensor for monitoring temperature information of batteries and preventing accidents such as fire or explosion by finding a probable emergency such as overheating, and a circuit for processing output signals of the temperature sensor.

SUMMARY OF THE INVENTION

Embodiments of the present invention provide a battery pack in which electrode tabs of a battery mounted within a lower case and connection tabs are welded together.

Embodiments of the present invention also provide a manufacturing method for the battery pack, which can be simplified by welding electrode tabs to connection tabs at the same time through bonding part holes formed in a lower case of the battery back, and which can prevent welding failures by fixing the connection tabs at accurate positions using a connection tab mounting portion and a rib in the lower case.

According to one aspect of the present invention, there is provided a battery pack that includes a plurality of batteries, each including a first electrode tab and a second electrode tab, a plurality of connection tabs electrically connected to the plurality of batteries, a protection circuit module electrically connected to the plurality of batteries and to the connection tabs, a lower case accommodating the batteries, the connection tabs and the protection circuit module, the lower case includes a plurality of bonding part holes arranged at locations where the first electrode tabs and the second electrode tabs of the batteries are connected to the connection tabs and an upper case covering a top portion of the lower case.

The bonding part holes may include a plurality of first bonding part holes arranged at locations corresponding to where the first electrode tabs are connected to the connection tabs and a plurality of second bonding part holes arranged at locations corresponding to where the second electrode tabs are connected to the connection tabs, wherein each of the first bonding part holes being wider than each of the second bonding part holes. Each of the connection tabs may include a connection part having an interconnection, an insulating layer surrounding the interconnection and a bonding part electrically connected to one of the first electrode tab and the second electrode tab, the bonding part having the insulating layer removed therefrom.

Each bonding part may include a first bonding part connected to one of the first electrode tabs and a second bonding part connected to one of the second electrode tabs, wherein each first bonding part is wider than each second bonding part. The connection part may include a fixing hole to fix to the lower case. The connection part may include a fixing hole to attach to a rib protruding from an inside side of the lower case, the rib may pass through the fixing hole. The bonding part holes may emit heat from the bonding parts. The bonding parts may include one of nickel or a nickel alloy. One surface of each of the bonding parts may be connected to one of the first electrode tab and the second electrode tab, and a surface opposite from the one surface of each of the bonding parts may be exposed to an outside of the lower case through a corresponding one of the bonding part holes. The connection tabs may be mounted in connection tab mounting parts that may be recesses arranged on an inside of the lower case. The lower case may include a label attached to an outside thereof that may cover the bonding part holes.

According to another aspect of the present invention, there is provided a method of manufacturing a battery pack, including preparing a lower case perforated by a plurality of bonding part holes, mounting a plurality of connection tabs into the lower case, the connection tabs including a plurality of bonding parts arranged at locations that correspond to the bonding part holes, mounting a plurality of batteries into the lower case, each of the batteries including a first electrode tab and a second electrode tab that are arranged to correspond to the bonding parts, welding the first electrode tabs and the second electrode tabs to corresponding ones of the bonding parts after the batteries have been mounted in the lower case and attaching an upper case to the lower case after the welding.

The mounting of the connection tabs may include fixing the connection tabs to the lower case by inserting ribs protruding from an inside side of the lower case into fixing holes arranged in the connection tabs. The welding may include welding the first and second electrode tabs to the bonding parts while the batteries are mounted in the lower case and arranged within a jig. The welding may include spot welding the first and second electrode tabs to the bonding parts. The welding may include positioning a first welding rod below one of the bonding parts exposed through one of the bonding part holes and positioning a second welding rod on one of the first and second first electrode tabs at a location directly above the first welding rod. The preparing of the lower case may include preparing the lower case such that the bonding part holes include first bonding part holes that are larger than second bonding part holes, the first bonding part holes may correspond to the first electrode tabs and the second bonding part holes may correspond to the second electrode tabs. The method may also include attaching a label to an outside of the lower case to cover the bonding part holes.

BRIEF DESCRIPTION OF THE DRAWINGS

A more complete appreciation of the invention, and many of the attendant advantages thereof, will be readily apparent as the same becomes better understood by reference to the following detailed description when considered in connection with the accompanying drawings in which like reference symbols indicate the same or similar components, wherein.

DETAILED DESCRIPTION OF THE INVENTION

Reference will now be made in detail to the present embodiments of the present invention, examples of which are illustrated in the accompanying drawings such that they can easily be made and used by those skilled in the art.

First, the battery pack 1000 according to the embodiment of the present invention will be described.

Figure 1:
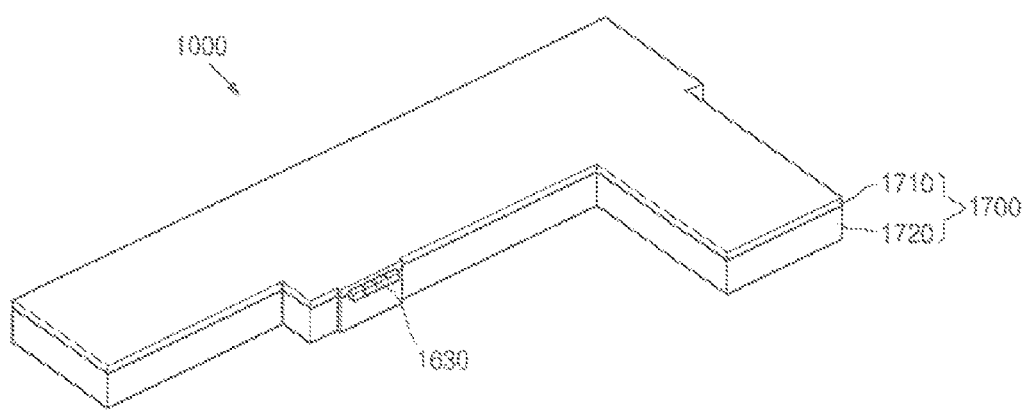
FIG. 1 is a perspective view of a battery pack according to an embodiment of the present invention.
Figure 2:
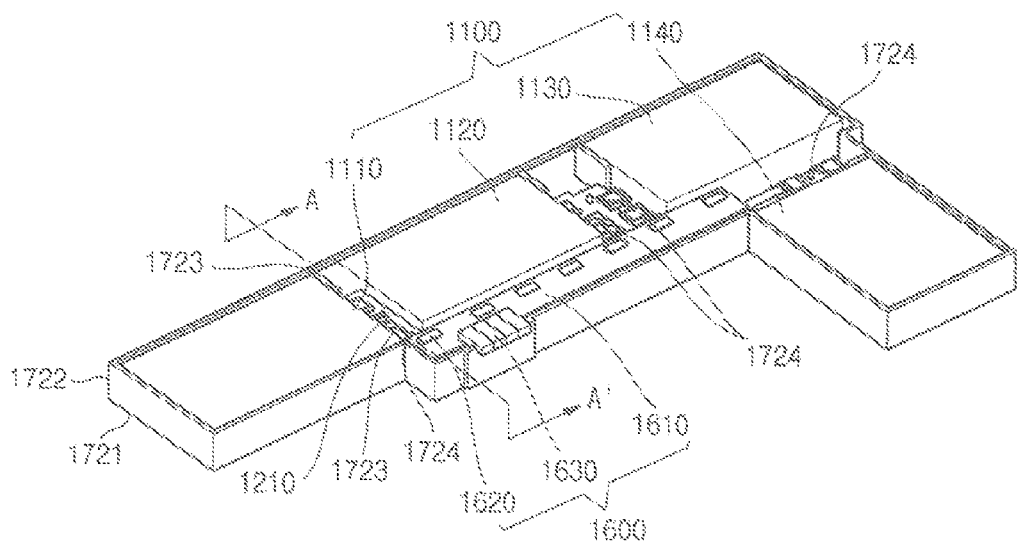
FIG. 2 is a perspective view of the battery pack of FIG. 1, from which an upper case is removed.
Figure 3:
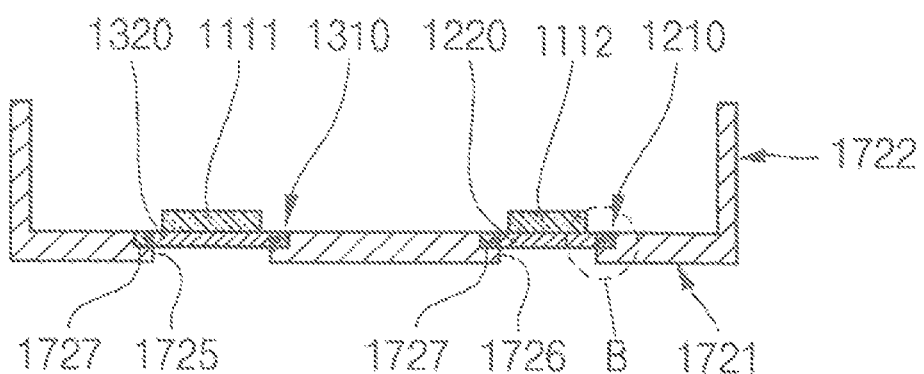
FIG. 3 is vertically sectional view taken along the line A-A' of FIG. 2.
Figure 4:
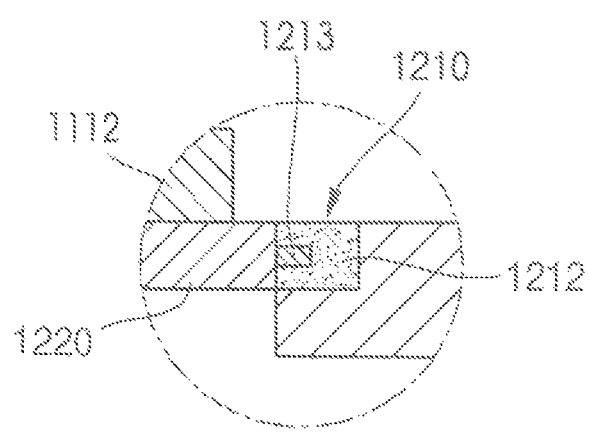
FIG. 4 is an enlarged sectional view of a 'B' portion of FIG. 3.
Figure 5A:
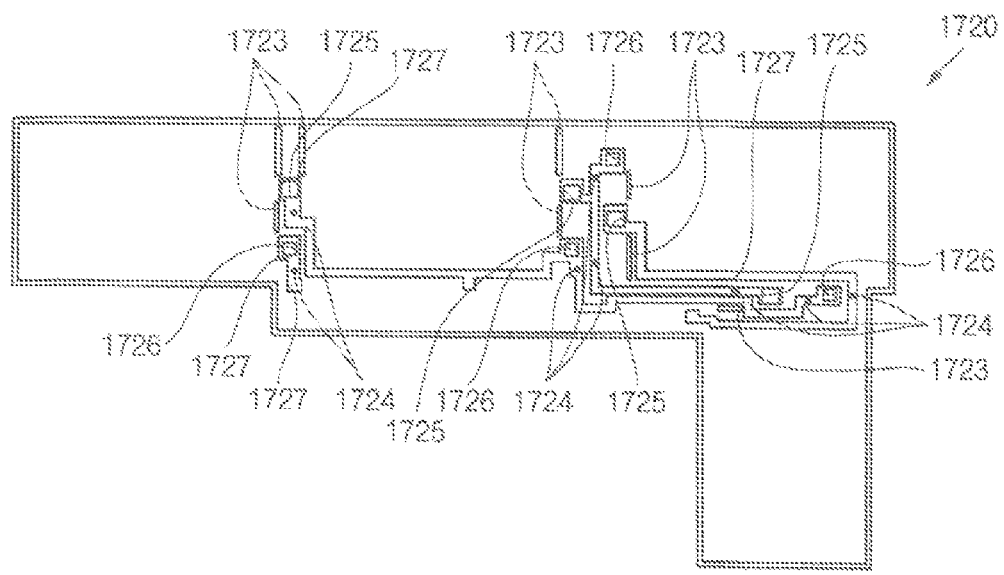
FIG. 5A is a plan view of a lower case of FIG. 2.
Figure 6:
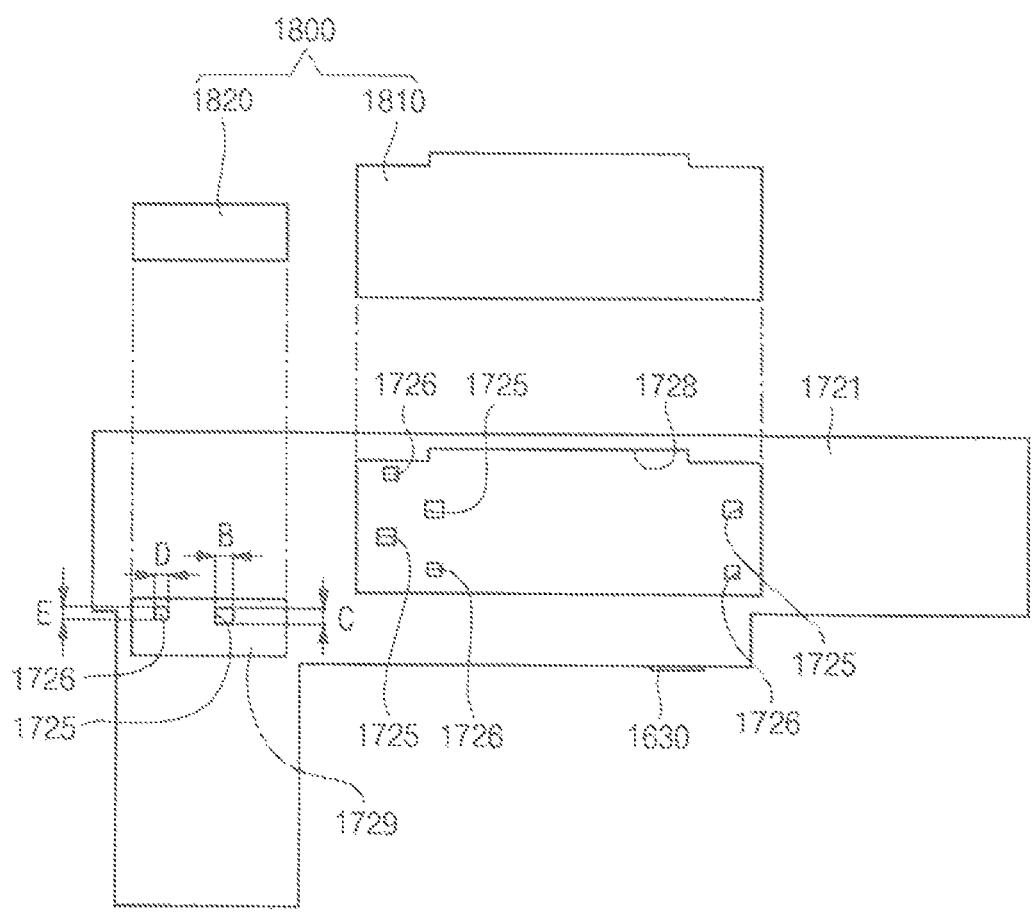
FIG. 6 is a plan view illustrating a rear surface of the lower case shown in FIG. 5A.

FIG. 1 is a perspective view of a battery pack according to an embodiment of the present invention, FIG. 2 is a perspective view of the battery pack of FIG. 1, from which an upper case is removed, FIG. 3 is vertically sectional view taken along the line A-A' of FIG. 2, FIG. 4 is an enlarged sectional view of a 'B' portion of FIG. 3, and FIG. 6 is a plan view illustrating a rear surface of the lower case shown in FIG. 5A.

The battery pack 1000 may include a plurality of batteries 1100, connection tabs 1200, 1300, 1400 and 1500, a protection circuit module 1600 and a case 1700. The battery pack 1000 may further include a label 1800.

In the battery pack 1000, the plurality of batteries 1100 are electrically connected using one or more connection tabs 1200. In addition, the connection tabs 1200 are electrically connected to the protection circuit module 1600. In detail, the batteries 1100 are electrically connected to the protection circuit module 1600 through the connection tabs 1200. The batteries 1100 have electrode tabs having different polarities welded to a bonding part 1220 of the connection tab 1200. The battery pack 1000 has bonding part holes 1725 and 1726 formed in the lower case 1720. The bonding part holes 1725 and 1726 are formed to allow the connection tab 1200 and the batteries 1100 to be welded in a jig at the same time after the connection tab 1200 and the batteries 1100 are mounted in the lower case 1720.

The batteries 1100 may be connected in series or parallel to each other. The batteries 1100 may be connected in a combination of series and parallel connections such that some of the plurality of batteries 1100 are connected in parallel to each other and the other of the plurality of batteries 1100 are connected in series each other. In the illustrated embodiment, 4 batteries 1110, 1120, 1130 and 1140 are shown, but the invention is not limited thereto. In the battery pack 1000 according to the embodiment of the present invention, a predetermined number of batteries may be arranged horizontally or vertically, but the number of batteries is not limited thereto. The batteries may be arranged in various manners in view of the number.

In addition, the following description will be made with regard to a first battery 1110 of the plurality of batteries 1100 by way of example. The first battery 1110 may be implemented by a pouch type rechargeable battery, but not limited thereto. The first battery 1110 may have various shapes.

The first battery 1110 includes a first electrode tab 1111, a second electrode tab 1112 and an insulation part 1113. The first electrode tab 1111 may be a positive electrode tab and the second electrode tab 1112 may be a negative electrode tab. In addition, it is assumed that side surfaces of the first battery 1110 are wrapped by a label made of an insulating material.

The first battery 1110 may be implemented as a lithium-ion battery, but is not limited thereto. The first battery 1110 may instead be implemented as a nickel-cadmium battery, a nickel metal hydride (NiMH) battery, and so on.

In the battery pack 1000, one or more connection tabs 1200, 1300, 1400 and 1500 are used to electrically connect the plurality of batteries 1100 to each other. The connection tabs 1200, 1300, 1400 and 1500 may be implemented in various manners according to the arrangement of the batteries 1100. However, shapes of the connection tabs 1200, 1300, 1400 and 1500 are not limited to the illustrated shapes. The connection tabs 1200, 1300 and 1500 include connection leads 1250, 1350 and 1550 to be electrically connected to the protection circuit module 1600. However, positions of the connection tabs 1200, 1300 and 1500 having the connection leads 1250, 1350 and 1550 are limited to those illustrated in the embodiment. In addition, bonding parts 1220, 1320, 1330, 1340, 1420, 1430, 1440, and 1520 formed in the connection tabs 1200, 1300, 1400 and 1500 may include positive electrode bonding parts 1320, 1420, 1440, and 1520 connected to positive electrode tabs of batteries, and negative electrode bonding parts 1220, 1330, 1340, and 1430 connected to negative electrode tabs of batteries. The bonding parts 1220, 1320, 1330, 1340, 1420, 1430, 1440, and 1520 may be implemented in various manners according to positions of batteries connected thereto and polarities of battery tabs.

First, the first connection tab 1200 connecting the first battery 1110 and the circuit board 1610 will now be described.

The first connection tab 1200 includes a first connection part 1210, a first bonding part 1220, a fixing hole 1211, and a connection lead 1250.

The first connection part 1210 includes an insulating layer 1212 surrounding an interconnection 1211 and the outside of the interconnection 1211. The first connection part 1210 has a fixing hole 1211 to allow a rib 1724 of the lower case 1720 to be tightly fixed thereto, which will later be described. As the fixing hole 1211 and the rib 1724 are engaged with each other, the first connection tab 1200 can be fixed at an accurate position. In addition, the first connection tab 1200 may have a connection tab mounting part 1727 formed in a case plate 1721 to later be described. The connection tab mounting part 1727 has the same shape as the first connection tab 1200 and is recessed to allow the first connection tab 1200 to be mounted therein. The first connection part 1210 is positioned in the connection tab mounting part 1727 to then be stably fixed.

The first bonding part 1220 is formed at a portion of the first connection part 1210. The first bonding part 1220 is electrically connected to the interconnection 1213 and is shaped of a plate made out of a metal. The insulating layer is removed from the plate of the first bonding part 1220. The metal may include nickel or a nickel alloy. In addition, the second electrode tab 1112 of the first battery 1110 is mounted on a top portion of the first bonding part 1220, so that a welding part (G) is welded to the first bonding part 1220 to then be electrically connected thereto.

In addition, the first bonding part 1220 is spot-welded to the second electrode tab 1112 in a state in which it is mounted within the lower case 1720. In the welding, a pair of upper and lower welding rods 2100 and 2200 to be described later are used. The upper welding rods 2100 are positioned on the second electrode tab 1112, and the lower welding rods 2200 are positioned beneath the first bonding part 1220. The first bonding part 1220 may be exposed through the bonding part holes 1726 in the lower case 1720, to be described later, such that the bottom surface of the first bonding part 1220 corresponds to the lower welding rod 2200. The pair of welding rods 2100 and 2200 are used to weld the first bonding part 1220 and the second electrode tab 1112 at the same time.

The second connection tab 1300 includes a second connection part 1310, a second bonding part 1320, a third bonding part 1330, a fourth bonding part 1340 and a fixing hole 1311. The second connection tab 1300 electrically connects the first battery 1110, the second battery 1120 and the fourth battery 1140 to each other. In addition, the second connection tab 1300 may further include a connection lead 1350 to be electrically connected to protection circuit module 1600.

The second connection tab 1300 is substantially the same as the first connection tab 1200 in view of configuration and function, except for configurations of second to fourth bonding parts 1320, 1330 and 1340. Accordingly, the components that have the same function as those of the drawings of the first connection tab 1200 are referred to as the same reference numerals, and the following description will focus on connections of the second to fourth bonding parts 1320, 1330 and 1340.

The second bonding part 1320 is connected to the first electrode tab 1111 of the first battery 1110 after the first electrode tab 1111 is placed thereon. The third bonding part 1330 is connected to the second electrode tab 1122 of the second battery 1120 after the second electrode tab 1122 is placed thereon. In addition, the fourth bonding part 1340 is connected to the second electrode tab 1142 of the fourth battery 1140 after the second electrode tab 1142 is placed thereon. The second connection tab 1300 has an interconnection formed in the second connection part 1310 to allow the batteries to be connected in series or parallel to each other. In addition, the second connection tab 1300 is placed in the connection tab mounting part 1727 of the case plate 1721 and stably fixed by the rib 1724 penetrating through the fixing hole 1311.

The third connection tab 1400 includes a third connection part 1410, a fifth bonding part 1420, a sixth bonding part 1430, a seventh bonding part 1440 and a fixing hole 1411. The third connection tab 1400 is substantially the same as the second connection tab 1300 in view of configuration and function, except for configurations of fifth to seventh bonding parts 1420, 1430 and 1440. Accordingly, the components that have the same function as those of the drawings of the second connection tab 1300 are referred to as the same reference numerals, and the following description will focus on connections of the fifth to seventh bonding parts 1420, 1430 and 1440.

The fifth bonding part 1420 is connected to the first electrode tab 1121 of the second battery 1120 after the first electrode tab 1121 is placed thereon. The sixth bonding part 1430 is connected to the second electrode tab 1132 of the third battery 1130 after the second electrode tab 1132 is placed thereon. In addition, the seventh bonding part 1440 is connected to the first electrode tab 1141 of the fourth battery 1140 after the second electrode tab 1142 is placed thereon. The third connection tab 1400 has an interconnection formed in the third connection part 1410 to allow the batteries to be connected in series or parallel to each other. In addition, the third connection tab 1400 is placed in the connection tab mounting part 1727 of the case plate 1721 and stably fixed by the rib 1724 penetrating through the fixing hole 1411.

The fourth connection tab 1500 includes a fourth connection part 1510, an eighth bonding part 1520, a fixing hole 1511 and a connection lead 1550. The fourth connection tab 1500 is substantially the same with the first connection tab 1200 in view of configuration and function, except for the configuration of the eighth bonding part 1520. Accordingly, the components that have the same function as those of the drawings of the first connection tab 1200 are referred to as the same reference numerals, and the following description will focus on connection mechanism of the eighth bonding part 1520.

The eighth bonding part 1520 is connected to the first electrode tab 1131 of the third battery 1130 after the first electrode tab 1131 is placed thereon. When the plurality of batteries 1110, 1120, 1130 and 1140 are connected in series, as shown, the first electrode tab 1131 of the third battery 1130 may be a highest-potential electrode and may be electrically connected to the protection circuit module 1600 using a connection lead 1550 of the fourth connection tab 1500. In addition, when the plurality of batteries 1110, 1120, 1130 and 1140 are connected in series, as shown, the second electrode tab 1112 of the first battery 1110 may be a lowest-potential electrode and may be electrically connected to the protection circuit module 1600 using a connection lead 1250 of the first connection tab 1200.

The protection circuit module 1600 includes a circuit board 1610, a connection tab fixing part 1620 and an external terminal 1630.

The circuit board 1610 may include an electric device (not shown) and a circuit pattern layer (not shown). The electric device collects state information such as charging status or temperature of the battery 1100 and controls charging/discharging operations of the battery 1100. In addition, the circuit board 1610 has a connection tab fixing part 1620 to which the connection tab electrically connected to the battery 1100 is fixed. The connection tab fixing part 1620 is formed as a through-hole through which the lead formed at one side of the connection tab penetrates and is then fixed by soldering. The external terminal 1630 may be used to perform data communication with an external circuit (not shown) or to supply power to an external power supply (not shown) or an external load (not shown).

The case 1700 includes an upper case 1710 and a lower case 1720.

In the case 1700, the batteries 1100, the connection tabs 1200, 1300, 1400 and 1500, and the protection circuit module 1600 are accommodated in the lower case 1720, and the upper case 1710 covers a top portion of the lower case 1720.

The lower case 1720 has a case sidewall 1722 vertically extending at an end of the case plate 1721, forming an internal space. In addition, the lower case 1720 may have a label 1800 attached to the outside of the case 1700 so as to cover the bonding part holes 1725 and 1726.

The case plate 1721 includes a partition wall 1723, a rib 1724, bonding part holes 1725 and 1726 and a connection tab mounting part 1727.

The partition wall 1723 may suppress movement of the batteries 1100 accommodated in the lower case 1720 and may allow the respective batteries 1100 to be placed at accurate positions.

The rib 1724 may be formed as a protrusion. The rib 1724 may include a plurality of ribs formed at regions of the case plate 1721 where the connection tabs 1200, 1300, 1400 and 1500 are placed. The ribs 1724 allow the connection tabs 1200, 1300, 1400 and 1500 to be fixed at accurate positions.

The bonding part holes 1725 and 1726 may be formed as through-holes at positions corresponding to bonding parts 1220, 1320, 1330, 1340, 1420, 1430, 1440, and 1520 of the connection tabs 1200, 1300, 1400 and 1500.

The bonding part holes 1725 and 1726 may expose one side surfaces of the first electrode bonding part 1320, 1420, 1440, 1520 and the second electrode bonding part 1220, 1330, 1340, 1430. In addition, the bonding part holes 1725 and 1726 may be passages through which heat of the first electrode bonding part 1320, 1420, 1440, 1520 and the second electrode bonding part 1220, 1330, 1340, 1430.

The first bonding part hole 1725 may be wider than the second bonding part hole 1726. That is to say, an area (B×C) of the first bonding part hole 1725 may be larger than an area (D×E) of the second bonding part hole 1726. In this case, it is assumed that the first bonding part hole 1725 allows the first electrode bonding part 1320, 1420, 1440, 1520 to be connected to positive or first electrodes of the batteries 1100. Referring to FIG. 6, in the lower case 1720, the bonding part holes 1725 and 1726 may have the same shapes as the bonding parts 1220, 1320, 1330, 1340, 1420, 1430, 1440, and 1520. The bonding part holes 1725 and 1726 and the bonding parts 1220, 1320, 1330, 1340, 1420, 1430, 1440, and 1520 may have various shapes, including a rectangular shape or a circular shape.

The connection tab mounting part 1727 may be recessed to have a region between the batteries 1100 and the case plate 1721 to allow the connection tabs 1200, 1300, 1400 and 1500 to be mounted therein. The connection tab mounting part 1727 may be recessed by a thickness corresponding to a thickness of each of the connection tabs 1200, 1300, 1400 and 1500. The connection tab mounting part 1727 allows the connection tabs 1200, 1300, 1400 and 1500 to be mounted at accurate positions and be stably fixed such that the connection tabs 1200, 1300, 1400 and 1500 are mounted in regions recessed from the case plate 1721. In addition, the connection tab mounting part 1727 has the ribs 1724 at a path along which the connection tabs 1200, 1300, 1400 and 1500 are mounted. The ribs 1724 are inserted into fixing holes 1211, 1311, 1411 and 1511 of the connection tabs 1200, 1300, 1400 and 1500, thereby fixing the connection tabs 1200, 1300, 1400 and 1500.

The label 1800 may be attached to the outside of the case 1700 so as to cover the bonding part holes 1725 and 1726. The label 1800 may be attached to the entire surface of the lower case 1720 or portions 1810 and 1820 corresponding to the bonding part holes 1725 and 1726.

A manufacturing method for a battery pack 1000 will now be described.

Figure 5B:
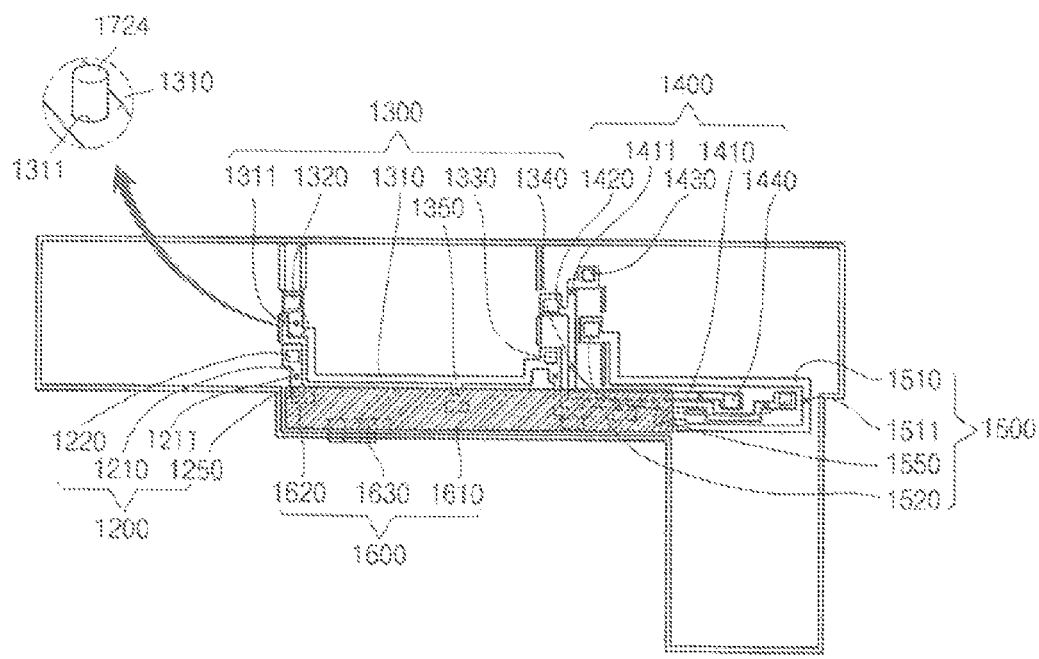
FIG. 5B is a plan view illustrating a state in which connection tabs are mounted in a lower case of FIG. 5A.
Figure 5C:
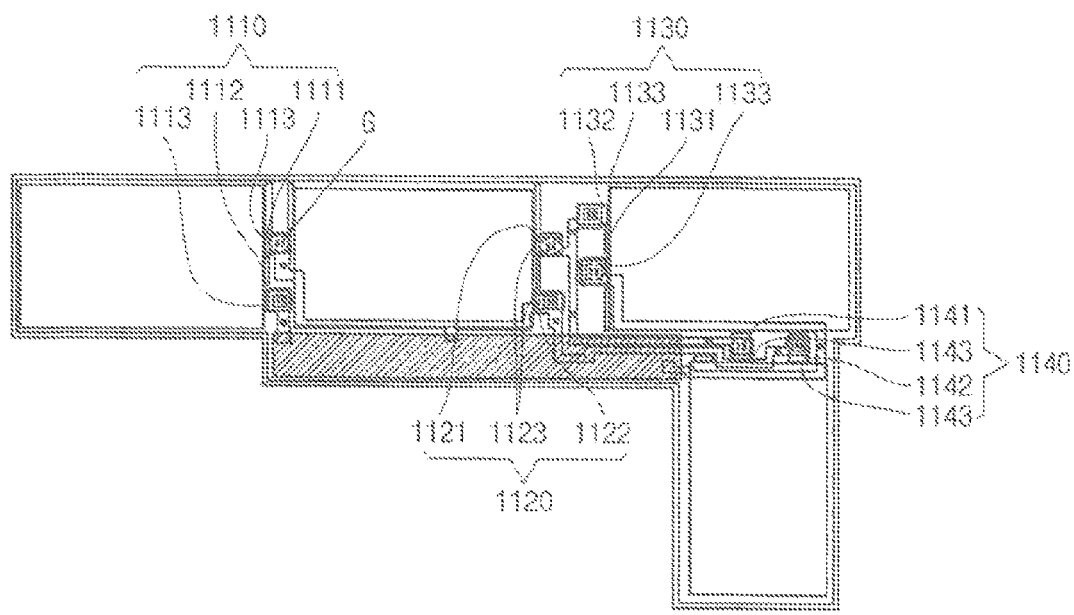
FIG. 5C is a plan view illustrating a state in which batteries are mounted in the lower case of FIG. 5B.
Figure 5D:
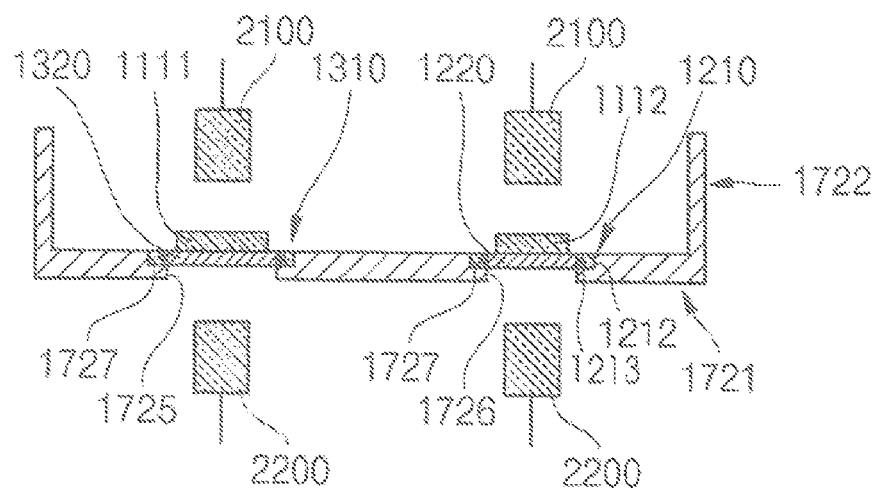
FIG. 5D is a sectional view taken along the line A-A' of FIG. 3.

FIG. 5A is a plan view of a lower case of FIG. 2, FIG. 5B is a plan view illustrating a state in which connection tabs are mounted in a lower case of FIG. 5A, FIG. 5C is a plan view illustrating a state in which batteries are mounted in the lower case of FIG. 5B, and FIG. 5D is a sectional view taken along the line A-A' of FIG. 3.

The manufacturing method for a battery pack 1000 includes preparing the lower case 1720, mounting the connection tabs 1200, 1300, 1400 and 1500, mounting batteries and completing the battery pack 1000.

Referring to FIG. 5A, in the preparing of the lower case 1720, the lower case 1720 having the bonding part holes 1725 and 1726 is prepared. In the lower case 1720, an area of the bonding part hole 1725 formed at the bonding part connected to a first electrode tab of battery may be larger than that of the bonding part hole 1726 formed at the bonding part connected to a second electrode tab. The lower case 1720 has the case sidewall 1722 vertically extending at an end of the case plate 1721, forming the internal space. The connection tabs 1200, 1300, 1400 and 1500 and batteries 1100 may be accommodated within the internal space.

Referring to FIG. 5B, in the mounting of the connection tabs 1200, 1300, 1400 and 1500, the connection tabs 1200, 1300, 1400 and 1500 are mounted such that the bonding parts 1220, 1320, 1330, 1340, 1420, 1430, 1440, and 1520 are positioned to correspond to the bonding part holes 1725 and 1726 of the lower case 1720. The connection tabs 1200, 1300, 1400 and 1500 are electrically connected using the protection circuit board 1610 and connection leads. The connection parts 1210, 1310, 1410 and 1510 of the connection tabs 1200, 1300, 1400 and 1500 can be stably fixed at accurate positions such that the ribs 1724 are inserted into the fixing holes 1211, 1311, 1411 and 1511. The bonding part holes 1725 and 1726 may expose one side surfaces of the electrode bonding parts 1220, 1320, 1330, 1340, 1420, 1430, 1440, and 1520.

Referring to FIG. 5C, in the mounting of the batteries 1100, the batteries 1100 are mounted in the lower case 1720 such that first and second electrode tabs of the batteries 1100 are positioned on top surfaces of the bonding parts 1220, 1320, 1330, 1340, 1420, 1430, 1440, and 1520.

Referring to FIG. 5D, in the welding, after the bonding parts 1220, 1320, 1330, 1340, 1420, 1430, 1440, and 1520 and the battery electrode tabs are mounted in the lower case 1720, the bonding parts 1220, 1320, 1330, 1340, 1420, 1430, 1440, and 1520 and the battery electrode tabs are welded together. The welding is performed by disposing the lower case 1720 having the connection tabs 1200, 1300, 1400 and 1500 and the batteries 1100 accommodated therein in a jig. In the welding, first welding rods 2100 are disposed over on the lower case 1720, and second welding rods 2200 are disposed under the bonding parts 1220, 1320, 1330, 1340, 1420, 1430, 1440, and 1520 exposed to the outside through the bonding part holes 1725 and 1726. The welding may include spot welding. In the mounting of the connection tabs 1200, 1300, 1400 and 1500 and the mounting of the batteries 1100, the connection tabs 1200, 1300, 1400 and 1500 and the batteries 1100 are stably mounted at accurate positions in the lower case 1720, thereby preventing welding failures of the battery pack.

In addition, the bonding part holes 1725 and 1726 are formed in the lower case 1720, and the connection tabs 1200, 1300, 1400 and 1500 and the batteries 1100 are mounted in the lower case 1720, the connection tabs 1200, 1300, 1400 and 1500 and the batteries 1100 are welded altogether, thereby simplifying the manufacturing process. Further, since the connection tabs 1200, 1300, 1400 and 1500 are fixed at accurate positions in the lower case 1720, it is possible to prevent welding failures due to movement of the bonding parts 1220, 1320, 1330, 1340, 1420, 1430, 1440, and 1520 and the first and second connection tabs during welding.

The completing of the battery pack 1000 comprises manufacturing the battery pack 1000 by covering a top portion of the lower case 1720 by the upper case 1710. In addition, the completing of the battery pack 1000 comprises attaching a label 1800 to cover the bonding part holes 1725 and 1726.

Exemplary embodiments of a battery pack a manufacturing method for the same have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a plurality of batteries, each including a first electrode tab and a second electrode tab;
   a plurality of connection tabs electrically connected to the plurality of batteries;
   a protection circuit module electrically connected to the plurality of batteries and to the connection tabs;

a lower case accommodating the batteries, the connection tabs and the protection circuit module; and an upper case covering a top portion of the lower case, wherein the lower case includes a plurality of bonding part holes arranged at locations where the first electrode tabs and the second electrode tabs of the batteries are connected to the connection tabs, wherein the lower case includes a label attached to an outside thereof that covers the bonding part holes.

2. The battery pack of claim 1, wherein the bonding part holes comprises:

a plurality of first bonding part holes arranged at locations corresponding to where the first electrode tabs are connected to the connection tabs; and a plurality of second bonding part holes arranged at locations corresponding to where the second electrode tabs are connected to the connection tabs, wherein each of the first bonding part holes being wider than each of the second bonding part holes.

3. The battery pack of claim 1, wherein each of the connection tabs comprises a fixing hole to fix to the lower case.

4. The battery pack of claim 1, wherein each of the connection tabs comprises a fixing hole to attach to a rib protruding from an inside side of the lower case, the rib passing through the fixing hole.

5. The battery pack of claim 1, wherein the lower case further comprises a plurality of connection tab mounting parts, the connection tab mounting parts being recesses arranged on an inside of the lower case, wherein the connection tabs are arranged within the connection tab mounting parts.

6. The battery pack of claim 1, wherein ones of the connection tabs extend from one of the first and second electrode tabs of one of the batteries to one of the first and second electrode tabs of another of the batteries, and without extending external to a combination of the upper case coupled to the lower case.

7. The battery pack of claim 1, wherein the first electrode tab is a positive electrode tab and the second electrode tab is a negative electrode tab.

8. The battery pack of claim 1, wherein the first electrode tab has an opposite polarity than the second electrode tab for each of the plurality of batteries.

9. The battery pack of claim 1, wherein each of the connection tabs comprises:

a connection part having an interconnection;

an insulating layer surrounding the interconnection; and a bonding part electrically connected to one of the first electrode tab and the second electrode tab, the bonding part having the insulating layer removed therefrom.

10. The battery pack of claim 9, wherein each bonding part comprises:

a first bonding part connected to one of the first electrode tabs; and a second bonding part connected to one of the second electrode tabs, wherein each first bonding part is wider than each second bonding part.

11. The battery pack of claim 9, wherein the connection tabs do not extend external to a combination of the upper and the lower cases.

12. The battery pack of claim 9, wherein the bonding parts are comprised of a material selected from a group consisting of nickel and a nickel alloy.

13. The battery pack of claim 9, wherein one surface of each of the bonding parts is connected to one of the first electrode tab and the second electrode tab, and a surface opposite from the one surface of each of the bonding parts is exposed to an outside of the lower case through a corresponding one of the bonding part holes.

14. A manufacturing method for a battery pack, comprising:

preparing a lower case perforated by a plurality of bonding part holes;

mounting a plurality of connection tabs into the lower case, the connection tabs including a plurality of bonding parts arranged at locations that correspond to the bonding part holes;

mounting a plurality of batteries into the lower case, each of the batteries including a first electrode tab and a second electrode tab that are arranged to correspond to the bonding parts;

welding the first electrode tabs and the second electrode tabs to corresponding ones of the bonding parts after the batteries have been mounted in the lower case; and attaching an upper case to the lower case after the welding.

15. The manufacturing method of claim 14, wherein the mounting of the connection tabs comprises fixing the connection tabs to the lower case by inserting ribs protruding from an inside side of the lower case into fixing holes arranged in the connection tabs.

16. The manufacturing method of claim 14, wherein the welding comprises welding the first and second electrode tabs to the bonding parts while the batteries are mounted in the lower case and arranged within a jig.

17. The manufacturing method of claim 16, wherein the welding comprises spot welding the first and second electrode tabs to the bonding parts.

18. The manufacturing method of claim 16, wherein the welding comprises positioning a first welding rod below one of the bonding parts exposed through one of the bonding part holes and positioning a second welding rod on one of the first and second first electrode tabs at a location directly above the first welding rod.

19. The manufacturing method of claim 14, wherein the bonding part holes comprise first bonding part holes that are larger than second bonding part holes, the first bonding part holes corresponding to the first electrode tabs and the second bonding part holes corresponding to the second electrode tabs.

20. The manufacturing method of claim 14, further comprising attaching a label to an outside of the lower case to cover the bonding part holes.

* * * * *